(12) United States Patent
Choi et al.

(10) Patent No.: US 12,088,921 B2
(45) Date of Patent: Sep. 10, 2024

(54) ELECTRONIC DEVICE FOR REDUCING LOW-LIGHT NOISE AND METHOD FOR OPERATING THE SAME

(71) Applicant: SAMSUNG ELECTRONICS CO., LTD., Suwon-si (KR)

(72) Inventors: Chiho Choi, Suwon-si (KR); Hakjoon Kim, Suwon-si (KR); Jungmin Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 113 days.

(21) Appl. No.: 17/841,384

(22) Filed: Jun. 15, 2022

(65) Prior Publication Data

US 2022/0408003 A1 Dec. 22, 2022

Related U.S. Application Data

(63) Continuation of application No. PCT/KR2022/007906, filed on Jun. 3, 2022.

(30) Foreign Application Priority Data

Jun. 16, 2021 (KR) .......................... 10-2021-0078280

(51) Int. Cl.
*H04N 23/71* (2023.01)
*G06T 5/50* (2006.01)
(Continued)

(52) U.S. Cl.
CPC .............. *H04N 23/71* (2023.01); *G06T 5/50* (2013.01); *G06T 5/70* (2024.01); *H04N 23/80* (2023.01)

(58) Field of Classification Search
CPC ........ H04N 23/71; H04N 23/80; H04N 23/81; H04N 23/65; G06T 5/50; G06T 5/70; G06T 7/11
See application file for complete search history.

(56) References Cited

U.S. PATENT DOCUMENTS

2007/0132868 A1 6/2007 Lee et al.
2009/0180704 A1 7/2009 Wey et al.
(Continued)

FOREIGN PATENT DOCUMENTS

JP 2003-274289 9/2003
JP 2015-56679 3/2015
(Continued)

OTHER PUBLICATIONS

English translation of Japanese Publication, JP-2020057885-A (Year: 2020).*

(Continued)

*Primary Examiner* — Shahbaz Nazrul
(74) *Attorney, Agent, or Firm* — NIXON & VANDERHYE P.C.

(57) ABSTRACT

According to various embodiments, an electronic device may comprise: a power converter; a camera module including a camera; and a processor configured to: identify a first illuminance value of a surrounding of the electronic device in a state in which a switching frequency of the power converter transferring power to the camera module is a first frequency; determine whether the first illuminance value meets a first reference; and set the switching frequency of the power converter to a second frequency different from the first frequency based on the first illuminance value meeting the first reference.

17 Claims, 9 Drawing Sheets

(51) Int. Cl.
*G06T 5/70* (2024.01)
*H04N 23/80* (2023.01)

(56) References Cited

U.S. PATENT DOCUMENTS

| | | | |
|---|---|---|---|
| 2015/0002407 A1* | 1/2015 | Knausz | H02M 1/44 |
| | | | 345/173 |
| 2016/0360130 A1 | 12/2016 | Wakabayashi et al. | |
| 2018/0035064 A1 | 2/2018 | Hoshina et al. | |
| 2018/0077368 A1 | 3/2018 | Suzuki | |
| 2019/0007637 A1 | 1/2019 | Nishikido | |
| 2019/0132539 A1 | 5/2019 | Otaka et al. | |
| 2020/0137283 A1 | 4/2020 | Hamaguchi et al. | |
| 2020/0402478 A1 | 12/2020 | Her et al. | |
| 2021/0051280 A1 | 2/2021 | Kumar et al. | |
| 2021/0059503 A1* | 3/2021 | Tanaka | A61B 1/00045 |
| 2021/0059646 A1* | 3/2021 | Siedenburg | H03F 3/45085 |

FOREIGN PATENT DOCUMENTS

| | | |
|---|---|---|
| JP | 2018-019292 | 2/2018 |
| JP | 2019-0080225 | 5/2019 |
| JP | 2020-057885 | 4/2020 |
| KR | 10-1994-0017757 | 7/1994 |
| KR | 10-1997-0056979 | 7/1997 |
| KR | 10-2005-0123001 | 12/2005 |
| KR | 10-2007-0060437 | 6/2007 |
| KR | 10-2009-0078583 | 7/2009 |
| KR | 10-2015-0053189 | 5/2015 |
| KR | 10-2018-0029872 | 3/2018 |
| KR | 10-2021-0020807 | 2/2021 |
| WO | 2018/198502 | 11/2018 |

OTHER PUBLICATIONS

Written Opinion of ISA in counterpart WO Application No. PCT/KR2022/007906.
International Search Report in counterpart WO Application No. PCT/KR2022/007906.
Extended European Search Report for EP Application No. 22825206.0 dated Jun. 25, 2024, 7 pages.

* cited by examiner

ELECTRONIC DEVICE FOR REDUCING LOW-LIGHT NOISE AND METHOD FOR OPERATING THE SAME

CROSS-REFERENCE TO RELATED APPLICATIONS

This application is a continuation of International Application No. PCT/KR2022/007906 designating the United States, filed on Jun. 3, 2022, in the Korean Intellectual Property Receiving Office and claiming priority to Korean Patent Application No. 10-2021-0078280, filed on Jun. 16, 2021, in the Korean Intellectual Property Office, the disclosures of which are incorporated by reference herein in their entireties.

BACKGROUND

Field

The disclosure relates to an electronic device for removing noise in low light and a method for operating the same.

Description of Related Art

Electronic devices perform DC-DC conversion on battery power by a converter to use it as an analog power source for the camera module. The converter may use a switching method to convert the battery power into power available to the camera module. The switching frequency may be determined depending on the current consumption at the output terminal, and the converter may operate in high frequency mode or low frequency mode.

When the converter operates at a specific frequency, power-related noise may occur in images taken by a camera in dark, low-light environments.

Power-related low-light noise may refer to noise that is caused in the sensor scan direction of the image as noise is induced due to periodic switching in the analog power which serves as a reference of the analog-to-digital converter of the camera sensor in low-ambient light environments.

SUMMARY

Embodiments of the disclosure provide an electronic device for removing low-light noise by changing the switching frequency in low-light environments.

The disclosure is not limited to the foregoing, and other unmentioned aspects would be apparent to one of ordinary skill in the art from the following description.

According to various example embodiments, an electronic device may comprise: a power converter; a camera module comprising a camera; and a processor configured to: identify a first illuminance value of a surrounding of the electronic device in a state in which a switching frequency of the power converter transferring power to the camera module is a first frequency; determine whether the first illuminance value meets a first reference; and set the switching frequency of the power converter to a second frequency different from the first frequency based on the first illuminance value meeting the first reference.

According to various example embodiments, a method for operating an electronic device may comprise: identifying a first illuminance value of a surrounding of the electronic device in a state in which a switching frequency of a power converter of the electronic device transferring power to a camera module of the electronic device is a first frequency; determining whether the first illuminance value meets a first reference; and setting the switching frequency of the power converter to a second frequency different from the first frequency based on the first illuminance value meeting the first reference.

According to various example embodiments, the electronic device may remove low-light noise.

According to various example embodiments, an electronic device for removing low-light noise and a method for operating the same is provided. Thus, it is possible to mitigate power-related low-light noise due to analog power provided to the camera module. Therefore, the user may obtain clear images without influence by the ambient environment.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
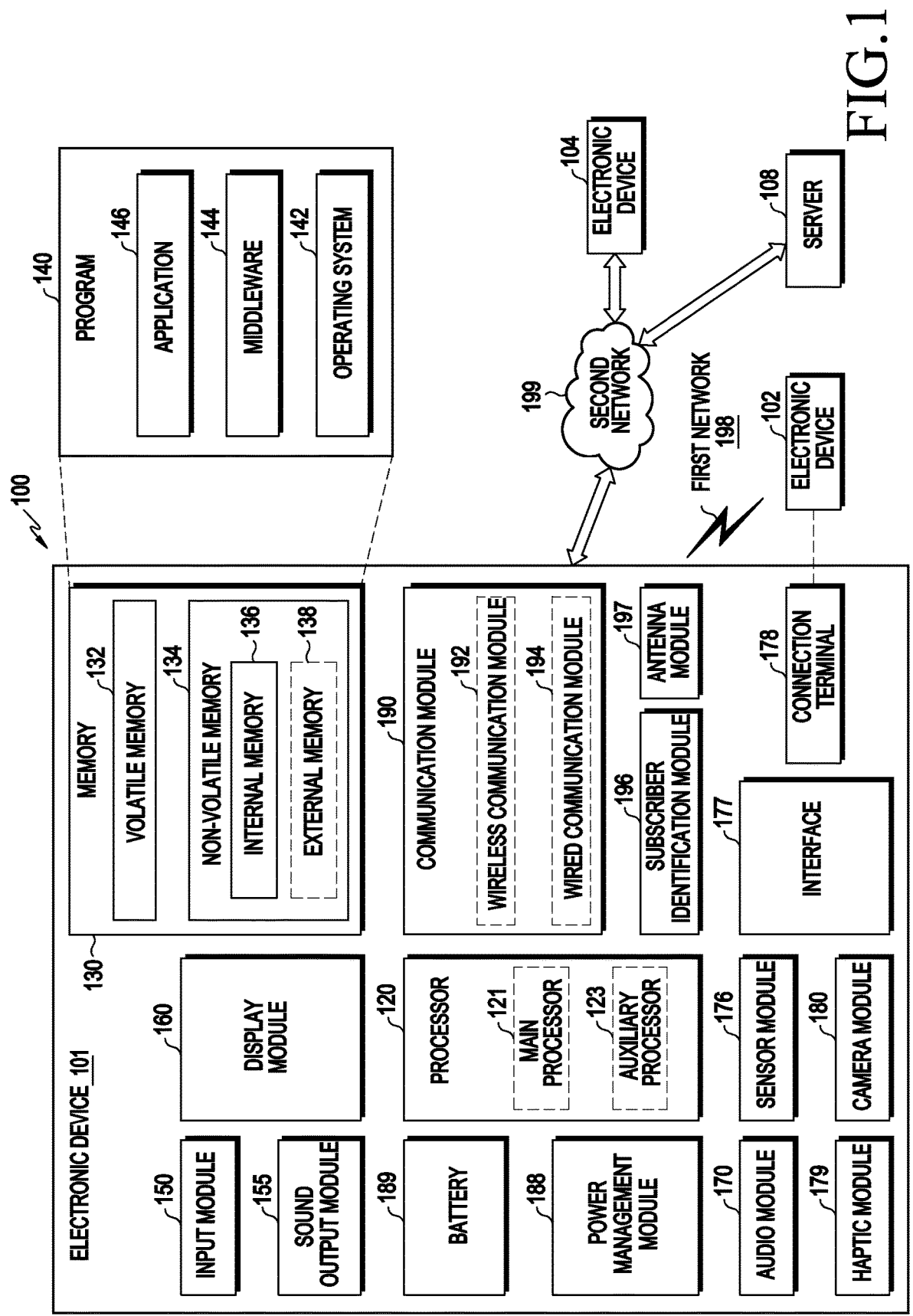
FIG. 1 is a block diagram illustrating an example electronic device in a network environment according to various embodiments.

FIG. 1 is a block diagram illustrating an example electronic device in a network environment according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beam forming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
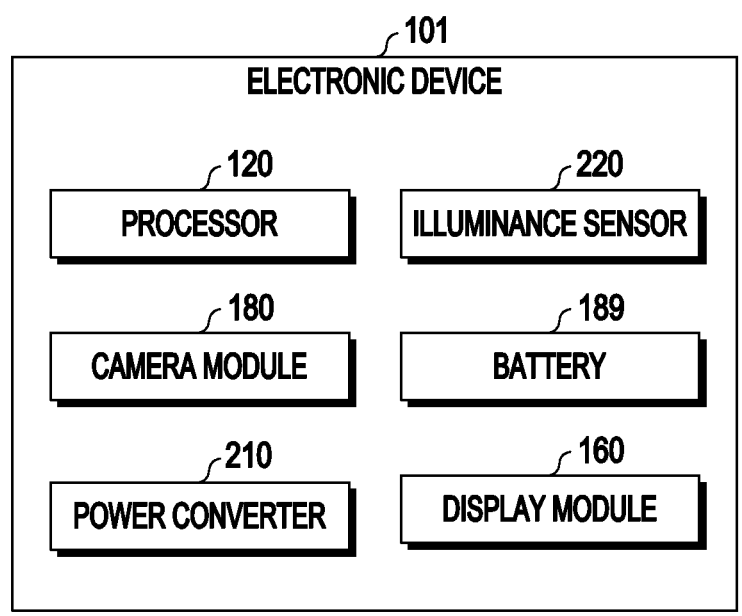
FIG. 2 is a block diagram illustrating an example configuration of an electronic device according to various embodiments.

FIG. 2 is a block diagram illustrating an example configuration of an electronic device according to various embodiments.

Referring to FIG. 2, according to an embodiment, an electronic device 101 may include a processor (e.g., including processing circuitry) 120, an illuminance sensor 220, a camera module (e.g., including a camera) 180, a battery 189, a power converter 210, and/or a display module (e.g., including a display) 160.

According to an embodiment, the illuminance sensor 220 may be included in the sensor module 176 of FIG. 1. According to an embodiment, the illuminance sensor 220 may be included in the camera module 180. According to an embodiment, the illuminance sensor 220 may be configured as a separate device, but is not limited to a specific type.

According to an embodiment, the electronic device 101 (e.g., the processor 120) may include various processing circuitry and identify the ambient brightness of the electronic device 101 using the illuminance sensor 220. For example, the electronic device 101 may identify the ambient brightness of the electronic device 101 based on the illuminance value obtained using the illuminance sensor 220, but the method for identifying the ambient brightness using the illuminance sensor 220 is not limited.

According to an embodiment, the electronic device 101 (e.g., the processor 120) may convert the power provided from the battery 189 by a power converter 210, and supply the converted power to the camera module 180. For example, the power converter 210 may convert first power having a first power value provided from the battery 189 into second power having a second power value and supply it to the camera module 180 According to an embodiment, the power converter 210 may convert power using a switching method. For example, the power converter 210 may convert the first power (e.g., DC power) into the second power (e.g., DC power) based on the switching frequency applied periodically. According to an embodiment, the power converter 210 may operate in a state in which the switching frequency is a first frequency (e.g., a low frequency) or in a state in which the switching frequency is a second frequency (e.g., a high frequency). The switching frequency of the power converter 210 may be frequency having various magnitudes, other than the first frequency or second frequency, but the magnitude of the switching frequency used for the operation of the power converter 210 is not limited. Hereinafter, frequency or magnitude of frequency may refer, for example, to the number (Hz) of oscillations. The magnitude of the first frequency (e.g., low frequency) used for operation of the power converter 210 may be less than the magnitude of the second frequency (e.g., high frequency), but the magnitude of the first frequency (e.g., low frequency) and/or the magnitude of the second frequency (e.g., high frequency) is not limited. According to an embodiment, that switching frequency is a low frequency may refer, for example, to the switching frequency being a first reference value (e.g., 100 kHz) or less, and that the switching frequency is a high frequency may refer, for example, to the switching frequency being a second reference value (e.g., 2 MHz) or more, but the reference values for the low frequency and high frequency are not limited.

According to an embodiment, the magnitude of the switching frequency used for operation of the power converter 210 may correspond to the load current at the output terminal. For example, the electronic device 101 may determine the magnitude of the switching frequency used for operation of the power converter 210 based on the magnitude of the load current required at the output terminal.

Figure 3:
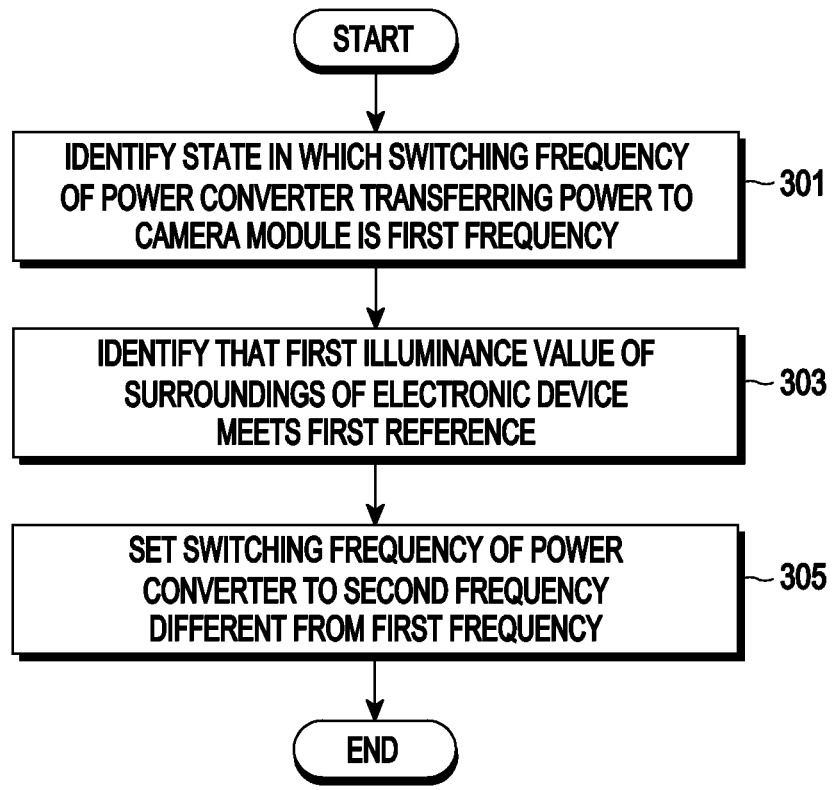
FIG. 3 is a flowchart illustrating an example method of operating an electronic device according to various embodiments.

FIG. 3 is a flowchart illustrating an example method of operating an electronic device according to various embodiments.

Referring to FIG. 3, in operation 301, according to various embodiments, the electronic device 101 (e.g., the processor 120) may identify the state in which the switching frequency of the power converter 210 transferring power to the camera module 180 is a low frequency (e.g., the first frequency). For example, the processor 120 may control (or set) the switching frequency of the power converter 210 to a low frequency (e.g., the first frequency). For example, the electronic device 101 may control (or set) the power converter 210 to operate at a switching frequency which is a preset reference value (e.g., 100 kHz) or less, but the reference value is not limited.

In operation 303, according to various embodiments, the electronic device 101 may identify the illuminance value (e.g., a first illuminance value) of the surroundings of the electronic device 101 and may identify that the illuminance value (e.g., the first illuminance value) of the surroundings of the electronic device 101 meets a preset reference (e.g., a first reference). For example, the electronic device 101 may identify the illuminance value (e.g., the first illuminance value) obtained using the illuminance sensor 220. As another example, the electronic device 101 may identify the illuminance value (e.g., the first illuminance value) of the surroundings of the electronic device 101 based on the pixel value of the image obtained through the camera module 180. For example, the electronic device 101 may determine that the first illuminance value meets a preset reference (e.g., the first reference) based on the first illuminance value, obtained using the illuminance sensor 220 in a state in which the switching frequency of the power converter 210 is a low frequency (e.g., the first frequency), or the first illuminance value, identified based on the pixel value of the image obtained through the camera module 180, being a preset reference value (e.g., 20 Lux) or less. As another example, the electronic device 101 may determine that the first illuminance value meets a preset reference (e.g., the first reference) based on a state, in which the first illuminance value, obtained using the illuminance sensor 220 in a state in which the switching frequency of the power converter 210 is a low frequency (e.g., the first frequency), or the first illuminance value, identified based on the pixel value of the image obtained through the camera module 180, is a preset reference value (e.g., 20 Lux) or less, being maintained for a preset first time (e.g., 3 seconds). According to an embodiment, the electronic device 101 may determine that the ambient environment of the electronic device 101 is a low-light environment based on the illuminance value (e.g., the first illuminance value) obtained using the illuminance sensor 220 or the illuminance value (e.g., the first illuminance value) identified based on the pixel value of the image obtained through the camera module 180 meeting a preset reference (e.g., the first reference). According to an embodiment, the electronic device 101 may identify the illuminance value based on the pixel value of at least part of the captured image. For example, when the pixel value of the at least part meets a designated condition, the electronic device 101 may identify the ambient illuminance (e.g., determine that the ambient environment is a low-light environment) in which case the electronic device 101 may identify the ambient illuminance (e.g., determine whether the ambient environment is a low-light environment) without using the illuminance sensor 220.

In operation 305, according to various embodiments, the electronic device 101 may set the switching frequency of the power converter 210 to a second frequency (e.g., high frequency) different from the first frequency (e.g., low frequency) (e.g., higher than the first frequency) based on the illuminance value (e.g., the first illuminance value) obtained using the illuminance sensor 220 or the illuminance value (e.g., the first illuminance value) identified based on the pixel value of the image obtained through the camera module 180 meeting a preset reference (e.g., the first reference). For example, the electronic device 101 may set the switching frequency of the power converter 210 to a high frequency which has a preset reference value (e.g., 2 MHz) or more based on identifying that the ambient environment of the electronic device 101 is a low-light environment, but the reference value is not limited.

According to various embodiments, the electronic device 101 may provide low-light noise-reduced images by performing the operations disclosed in FIG. 3.

Figure 4:
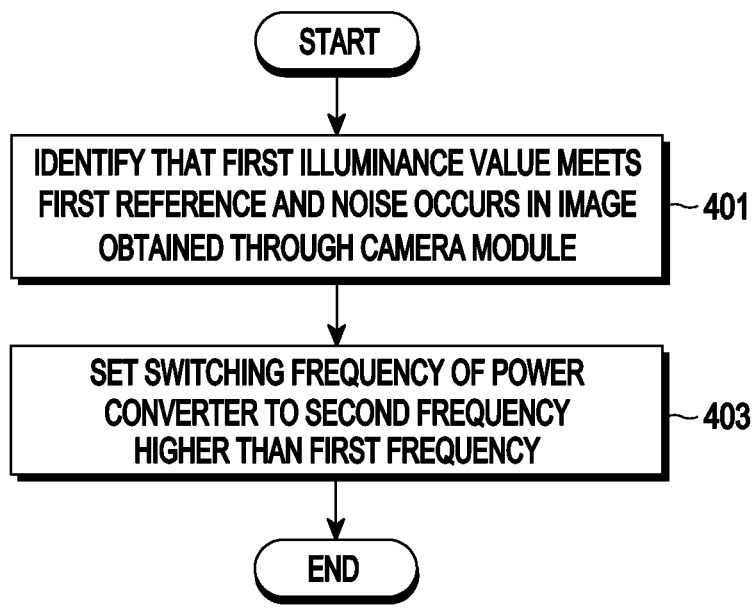
FIG. 4 is a flowchart illustrating an example method of operating an electronic device according to various embodiments.

FIG. 4 is a flowchart illustrating an example method of operating an electronic device according to various embodiments.

Referring to FIG. 4, in operation 401, according to various embodiments, the electronic device 101 (e.g., the processor 120) may identify that noise occurs in an image obtained through the camera module 180 in a state in which the illuminance value (e.g., the first illuminance value) obtained using the illuminance sensor 220 or the illuminance value (e.g., the first illuminance value) identified based on the pixel value of the image obtained through the camera module 180 meets a preset reference (e.g., the first reference). For example, the electronic device 101 may identify that noise occurs in the image obtained through the camera module 180 in a state in which the switching frequency of the power converter 210 is a low frequency (e.g., the first frequency), and the illuminance value (e.g., the first illuminance value) obtained using the illuminance sensor 220 or the illuminance value (e.g., the first illuminance value) identified based on the pixel value of the image obtained through the camera module 180 meets a preset reference (e.g., 20 Lux or less or the state of being 20 Lux or less lasts for 3 seconds or longer). A method in which the electronic device 101 identifies an occurrence of noise is described below.

In operation 403, according to various embodiments, the electronic device 101 may set the switching frequency of the power converter 210 to a second frequency (e.g., high frequency) higher than the first frequency (e.g., low frequency) based on identifying that noise occurs in the image obtained through the camera module 180 in a state in which the illuminance value (e.g., the first illuminance value) obtained using the illuminance sensor 220 or the illuminance value (e.g., the first illuminance value) identified based on the pixel value of the image obtained through the camera module 180 meets the preset reference (e.g., the first reference). For example, the electronic device 101 may set the switching frequency of the power converter 210 to a high frequency which has a preset reference value (e.g., 2 MHz) or more based on identifying that noise occurs in the image obtained through the camera module 180 in a state in which the ambient environment of the electronic device 101 is a low-light environment, but the reference value is not limited.

Figure 5A:
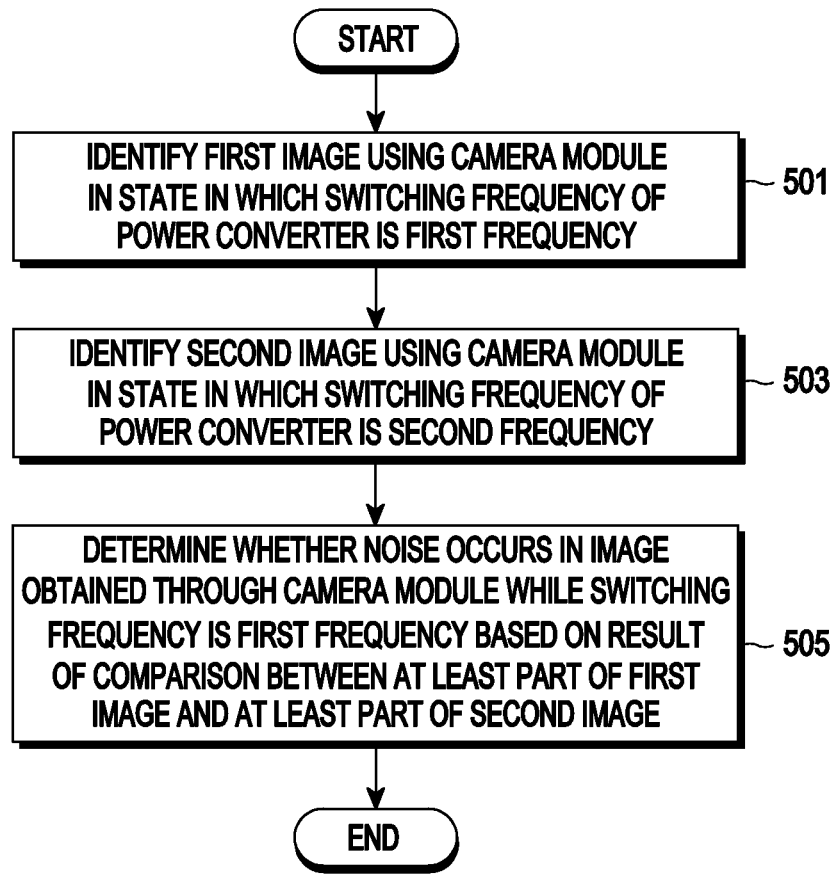
FIG. 5A is a flowchart illustrating an example method of operating an electronic device according to various embodiments.
Figure 5B:
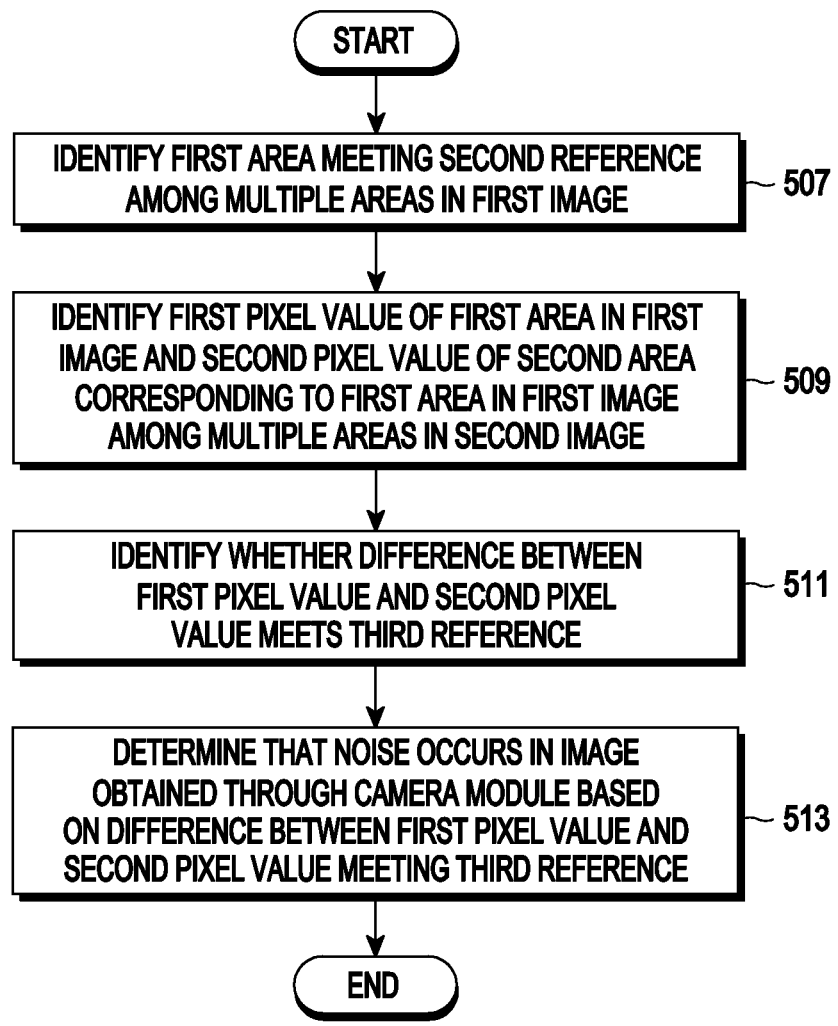
FIG. 5B is a flowchart illustrating an example method of operating an electronic device according to various embodiments.

FIG. 5A is a flowchart illustrating an example method of operating an electronic device according to various embodiments. FIG. 5B is a flowchart illustrating an example method of operating an electronic device according to various embodiments. An operation in which the electronic device 101 identifies an occurrence of noise in an image obtained through the camera module 180 is described with reference to FIGS. 5A and 5B.

Referring to FIG. 5A, in operation 501, according to various embodiments, the electronic device 101 (e.g., the processor 120) may identify a first image using the camera module 180 in a state in which the switching frequency of the power converter 210 is the first frequency (e.g., low frequency). The image (e.g., the first image) identified using the camera module 180 in a state in which the switching frequency of the power converter 210 is a low frequency (e.g., the first frequency) may be referred to as a low frequency image.

In operation 503, according to various embodiments, the electronic device 101 (e.g., the processor 120) may identify a second image using the camera module 180 in a state in which the switching frequency of the power converter 210 is the second frequency (e.g., high frequency). The image (e.g., the second image) identified using the camera module 180 in a state in which the switching frequency of the power converter 210 is a high frequency (e.g., the second frequency) may be referred to as a high frequency image.

In operation 505, according to various embodiments, the electronic device 101 may determine whether noise occurs in the image obtained through the camera module 180 while the switching frequency is the first frequency (e.g., low frequency) based on a result of comparison between at least part of the first image (e.g., low-frequency image) and at least part of the second image (e.g., high-frequency image). According to an embodiment, the electronic device 101 may use the result of comparison between the whole first image (e.g., low-frequency image) and the whole second image (e.g., high-frequency image). For example, the electronic device 101 may determine whether noise occurs in the image obtained through the camera module 180 while the switching frequency is the first frequency (e.g., low frequency) based on the result of comparison between the whole first image (e.g., low-frequency image) and the whole second image (e.g., high-frequency image). According to an embodiment, the electronic device 101 may use a result of comparison between an area (e.g., a first area) of the first image (e.g., low-frequency image) and an area (e.g., a second area) of the second image (e.g., high-frequency image).

A method in which the electronic device 101 determines whether noise occurs in the image obtained through the camera module 180 while the switching frequency is the first frequency (e.g., low frequency) based on a result of comparison between at least part of the first image (e.g., low-frequency image) and at least part of the second image (e.g., high-frequency image) is described in greater detail below with reference to FIG. 5B.

Referring to FIG. 5B, in operation 507, according to an embodiment, the electronic device 101 (e.g., the processor 120) may identify an area (e.g., the first area) meeting a preset reference (e.g., the second reference) among a plurality of areas of the first image (e.g., low-frequency image). According to an embodiment, the electronic device 101 may identify an area (e.g., the second area) meeting a preset reference (e.g., the second reference) among a plurality of areas of the second image (e.g., high-frequency image). The preset reference (e.g., the second reference) for identifying an area (e.g., the first area (or second area)) among the plurality of areas of the first image (or second image) is described below.

In operation 509, according to various embodiments, the electronic device 101 may identify a pixel value. Pixel value may refer, for example, to a value obtained by converting the amount of light received by the photodiode corresponding to the pixel into a voltage. Identifying the pixel value of an image (or the pixel value of a specific area in an image) may refer, for example, to identifying the pixel value of each of the pixels included in the image (or the specific area in the image). For example, the electronic device 101 may identify a pixel value (e.g., a first pixel value) of the first area meeting a preset reference (e.g., the second reference) among the plurality of areas of the first image and identify a pixel value (e.g., a second pixel value) of the second area corresponding to the first area of the first image among the plurality of areas of the second image. As another example, the electronic device 101 may identify the pixel value (e.g., the second pixel value) of the second area meeting the preset reference (e.g., the second reference) among the plurality of areas of the second image and identify the pixel value (e.g., the first pixel value) of the first area corresponding to the second area of the second image among the plurality of areas of the first image. Or, as another example, the electronic device 101 may identify the pixel value (e.g., the first pixel value) of the first area meeting the preset reference (e.g., the second reference) among the plurality of areas of the first image and identify the pixel value (e.g., the second pixel value) of the second area meeting the preset reference (e.g., the second reference) among the plurality of areas of the second image.

In operation 511, according to various embodiments, the electronic device 101 may identify that a difference between the first pixel value of the first area of the first image (e.g., low-frequency image) and the second pixel value of the second area of the second image (e.g., high-frequency image) meets a preset reference (e.g., the third reference). For example, the electronic device 101 may identify that the preset reference (e.g., the third reference) is met based on the sum of the differences between the first pixel values and the second pixel values exceeding a preset reference value. This is an example, and the preset reference (e.g., the third reference) for determining the difference between the first pixel value and the second pixel value is described below.

The difference between the first pixel value and the second pixel value may refer, for example, to a difference between the pixel value of at least one pixel of the first area and the pixel value of at least one pixel of the second area corresponding to at least one pixel of the first area. For example, when the first area and the second area each include a plurality of pixels, there may be as many first pixel value-second pixel value differences as the plurality of pixels.

In operation 513, according to various embodiments, the electronic device 101 may determine that noise occurs in the image obtained through the camera module 180 based on the difference between the first pixel value and the second pixel value meeting the preset reference (e.g., the third reference).

Figure 6:
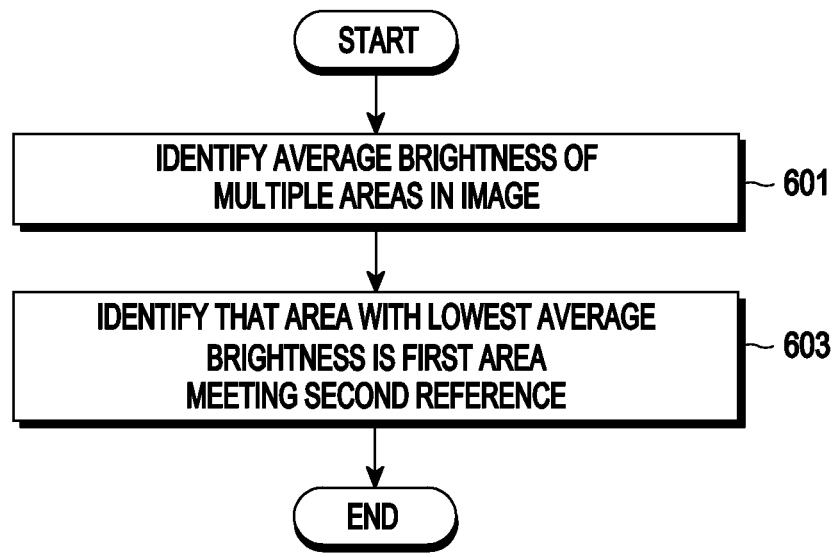
FIG. 6 is a flowchart illustrating an example method of operating an electronic device according to various embodiments.
Figure 7:
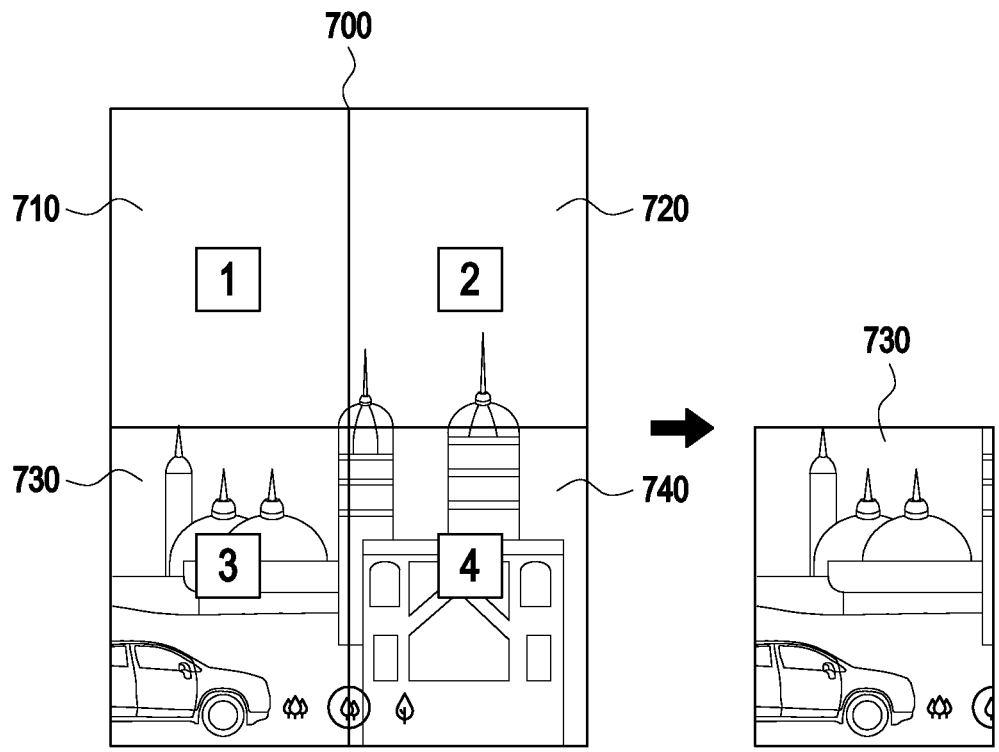
FIG. 7 is a diagram illustrating example operations of an electronic device according to various embodiments.

FIG. 6 is a flowchart illustrating an example method of operating an electronic device according to various embodiments. A preset reference (e.g., the second reference) for the electronic device 101 to identify an area (e.g., the first area or the second area) among a plurality of areas in a specific image (e.g., the first image (e.g., low-frequency image) or the second image (e.g., high-frequency image)) is described with reference to FIG. 6. FIG. 6 is described with reference to FIG. 7. FIG. 7 is a diagram illustrating example operations of an electronic device according to various embodiments.

Referring to FIG. 6, in operation 601, according to various embodiments, the electronic device 101 (e.g., the processor 120) may identify the average brightness of a plurality of areas in a specific image (e.g., the first image (e.g., low-frequency image) or the second image (e.g., high-frequency image)). For example, the electronic device 101 may identify the average brightness of the plurality of areas for at least one image of the first image (e.g., low-frequency image) or the second image (e.g., high-frequency image). Since the operation of identifying the average brightness of the plurality of areas of the first image (e.g., low-frequency image) by the electronic device 101 and the operation of identifying the average brightness of the plurality of areas of the second image (e.g., high-frequency image) by the electronic device 101 are similar, the operation of identifying the average brightness of the plurality of areas of the first image (e.g., low-frequency image) is described to avoid duplicate description. According to an embodiment, the electronic device 101 may summate the pixel values of the pixels included in the plurality of areas in the first image (e.g., low-frequency image), in a plurality of area units. For example, the electronic device 101 may identify the average brightness of the first area by identifying a first summated value which is the sum of the pixel value of the pixels of the first area in the first image (or the value obtained by dividing the first summated value by the number of pixels in the first area) and may perform the same operation on the other areas.

The method for identifying the average brightness of the plurality of areas in the image by the electronic device 101 is merely an example, but is not limited thereto.

In operation 603, according to various embodiments, the electronic device 101 may identify the area with the lowest average brightness among the plurality of areas in the specific image (e.g., the first image (e.g., low-frequency image) or the second image (e.g., high-frequency image)), as an area meeting the preset reference (e.g., the second reference). For example, the electronic device 101 may identify the first area with the lowest average brightness, among the plurality of areas in the first image (e.g., low-frequency image), as the area meeting the preset reference (e.g., the second reference) and may identify the second area corresponding to the first area in the first image, among the plurality of areas in the second image (e.g., high-frequency image). As another example, the electronic device 101 may identify the second area with the lowest average brightness, among the plurality of areas in the second image (e.g., high-frequency image), as the area meeting the preset reference (e.g., the second reference) and may identify the first area corresponding to the second area in the second image, among the plurality of areas in the first image (e.g., low-frequency image). As another example, the electronic device 101 may identify the first area with the lowest average brightness, among the plurality of areas in the first image (e.g., low-frequency image), as the area meeting the preset reference (e.g., the second reference) and may identify the second area with the lowest average brightness among the plurality of areas in the second image (e.g., high-frequency image), as the area meeting the preset reference (e.g., the second reference).

For example, referring to FIG. 7, the electronic device 101 may identify the average brightness of the plurality of areas (e.g., a first area 710, a second area 720, a third area 730, and a fourth area 740) in a specific image 700 (e.g., low-illuminance image) and identify the third area 730 with the lowest average brightness among the plurality of areas as the area meeting the preset reference (e.g., the second reference).

According to an embodiment, the plurality of areas in the specific image 700 may include a preset number of areas divided according to a preset layout. For example, as shown in FIG. 7, the plurality of areas 710, 720, 730, and 740 in the specific image 700 may define four areas according to a preset layout which is divided in four directions. As another example, although not shown, the plurality of areas in the specific image may include a preset number (e.g., four) of areas evenly divided up and down (or left and right), but the layout of the plurality of areas in the specific image are not limited.

Figure 8:
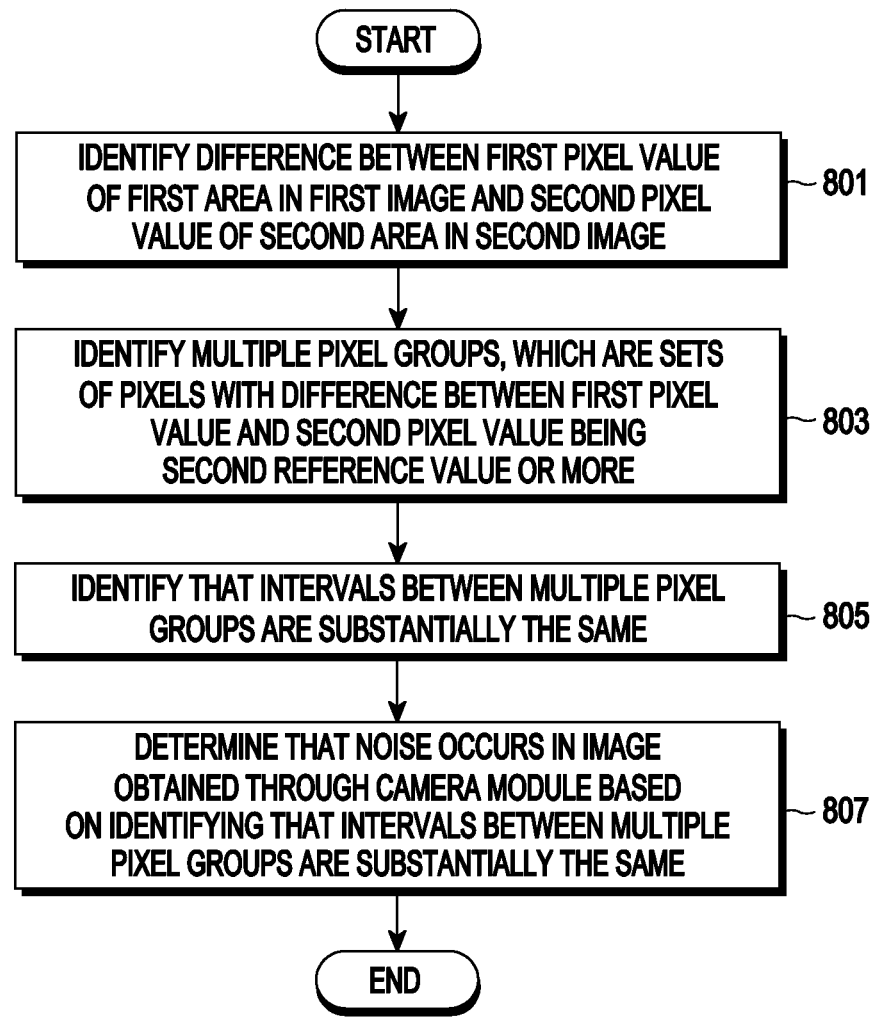
FIG. 8 is a flowchart illustrating an example method of operating an electronic device according to various embodiments.
Figure 9:
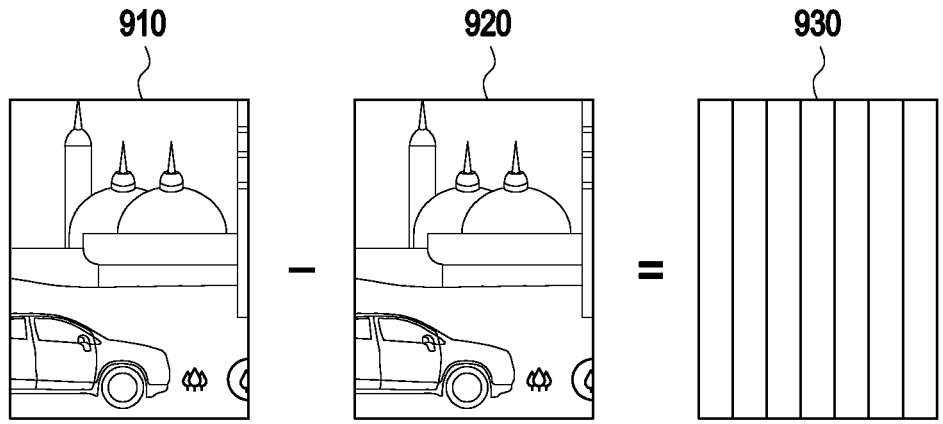
FIG. 9 is a diagram illustrating an example method of operating an electronic device according to various embodiments.

FIG. 8 is a flowchart illustrating an example method of operating an electronic device according to various embodiments. An operation in which the electronic device 101 identifies an occurrence of noise in an image obtained through the camera module 180 is described with reference to FIG. 8. FIG. 8 is described with reference to FIG. 9. FIG. 9 is a diagram illustrating an example method of operating an electronic device according to various embodiments.

Referring to FIG. 8, in operation 801, according to various embodiments, the electronic device 101 (e.g., the processor 120) may identify a difference between the first pixel value of the first area of the first image (e.g., low-frequency image) and the second pixel value of the second area of the second image (e.g., high-frequency image). For example, referring to FIG. 9, the electronic device 101 may identify a difference between the first pixel value of the first area of the first image 910 and the second pixel value of the second area of the second image 920. As described above, the first pixel value and the second pixel value may refer, for example, to as many pixel values as the number of pixels included in the first area and the second area, respectively.

In operation 803, according to various embodiments, the electronic device 101 may identify a plurality of pixel groups that are sets of pixels having a difference between the first pixel value and the second pixel value equal to or greater than a reference value (e.g., a second reference value). For example, referring to FIG. 9, the electronic device 101 may identify a difference 930 between the first pixel value and the second pixel value and may identify a plurality of pixel groups (e.g., the plurality of vertical lines shown in 930) which are sets of pixels (e.g., pixels of one vertical straight line (or area) in 930) with a difference between the first pixel value and the second pixel value larger than or equal to the reference value (e.g., the second reference value).

In operation 805, according to various embodiments, the electronic device 101 may identify that intervals between the plurality of pixel groups identified in operation 803 are substantially the same. For example, the electronic device 101 may identify that a first interval between the first group and the second group among the plurality of pixel groups is substantially the same as a second interval between the second group and the third group (or a third interval between the third group and the fourth group). For example, referring to FIG. 9C, the electronic device 101 may identify that the intervals between the plurality of vertical lines disclosed in 930 are substantially the same. According to an embodiment, the electronic device 101 may identify that a difference between the first pixel value of the first area of the first image (e.g., low-frequency image) and the second pixel value of the second area of the second image (e.g., high-frequency image) meets a preset reference (e.g., the third reference) based on the intervals between the plurality of pixel groups identified in operation 803 being substantially the same.

In operation 807, according to various embodiments, the electronic device 101 may determine that noise occurs in the image obtained through the camera module 180 based on identifying that the intervals between the plurality of pixel groups are substantially the same in operation 805.

According to an embodiment, although not shown, the electronic device 101 may determine that noise occurs in the image obtained through the camera module 180 based on the sum of the differences between the first pixel values and the second pixel values exceeding the preset reference value.

Figure 10:
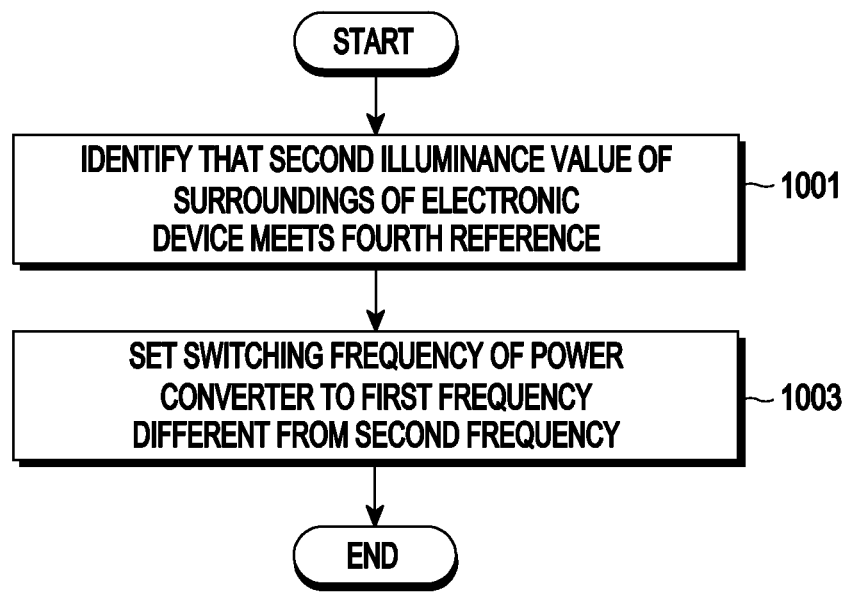
FIG. 10 is a flowchart illustrating an example method of operating an electronic device according to various embodiments.

FIG. 10 is a flowchart illustrating an example method of operating an electronic device according to various embodiments.

Referring to FIG. 10, in operation 1001, according to various embodiments, the electronic device 101 (e.g., the processor 120) may identify the illuminance value (e.g., a second illuminance value) of the surroundings of the electronic device 101 and may identify that the illuminance value (e.g., the second illuminance value) of the surroundings of the electronic device 101 meets a preset reference (e.g., a fourth reference). For example, the electronic device 101 may identify the illuminance value (e.g., the second illuminance value) obtained using the illuminance sensor 220. As another example, the electronic device 101 may identify the illuminance value (e.g., the second illuminance value) of the surroundings of the electronic device 101 based on the pixel value of the image obtained through the camera module 180. For example, the electronic device 101 may determine that the second illuminance value meets a preset reference (e.g., the fourth reference) based on the second illuminance value, obtained using the illuminance sensor 220 in a state in which the switching frequency of the power converter 210 is a high frequency (e.g., the second frequency), or the second illuminance value, identified based on the pixel value of the image obtained through the camera module 180, being a preset reference value (e.g., 60 Lux) or more. As another example, the electronic device 101 may determine that the second illuminance value meets a preset reference (e.g., the fourth reference) based on a state, in which the second illuminance value, obtained using the illuminance sensor 220 in a state in which the switching frequency of the power converter 210 is a high frequency (e.g., the second frequency), or the second illuminance value, identified based on the pixel value of the image obtained through the camera module 180, is a preset reference value (e.g., 60 Lux) or more, being maintained for a preset second time (e.g., 3 seconds). According to an embodiment, the electronic device 101 may determine that the ambient environment of the electronic device 101 is a high-light environment based on the illuminance value (e.g., the second illuminance value) obtained using the illuminance sensor 220 or the illuminance value (e.g., the second illuminance value) identified based on the pixel value of the image obtained through the camera module 180 meeting a preset reference (e.g., the fourth reference).

In operation 1003, according to various embodiments, the electronic device 101 may set the switching frequency of the power converter 210 to a first frequency (e.g., low frequency) different from the second frequency (e.g., high frequency) (e.g., lower than the second frequency) based on the illuminance value (e.g., the second illuminance value) obtained using the illuminance sensor 220 or the illuminance value (e.g., the second illuminance value) identified based on the pixel value of the image obtained through the camera module 180 meeting a preset reference (e.g., the fourth reference). For example, the electronic device 101 may set the switching frequency of the power converter 210 to a low frequency which has a preset reference value (e.g., 100 kHz) or less based on identifying that the ambient environment of the electronic device 101 is a high-light environment, but the reference value is not limited.

Figure 11:
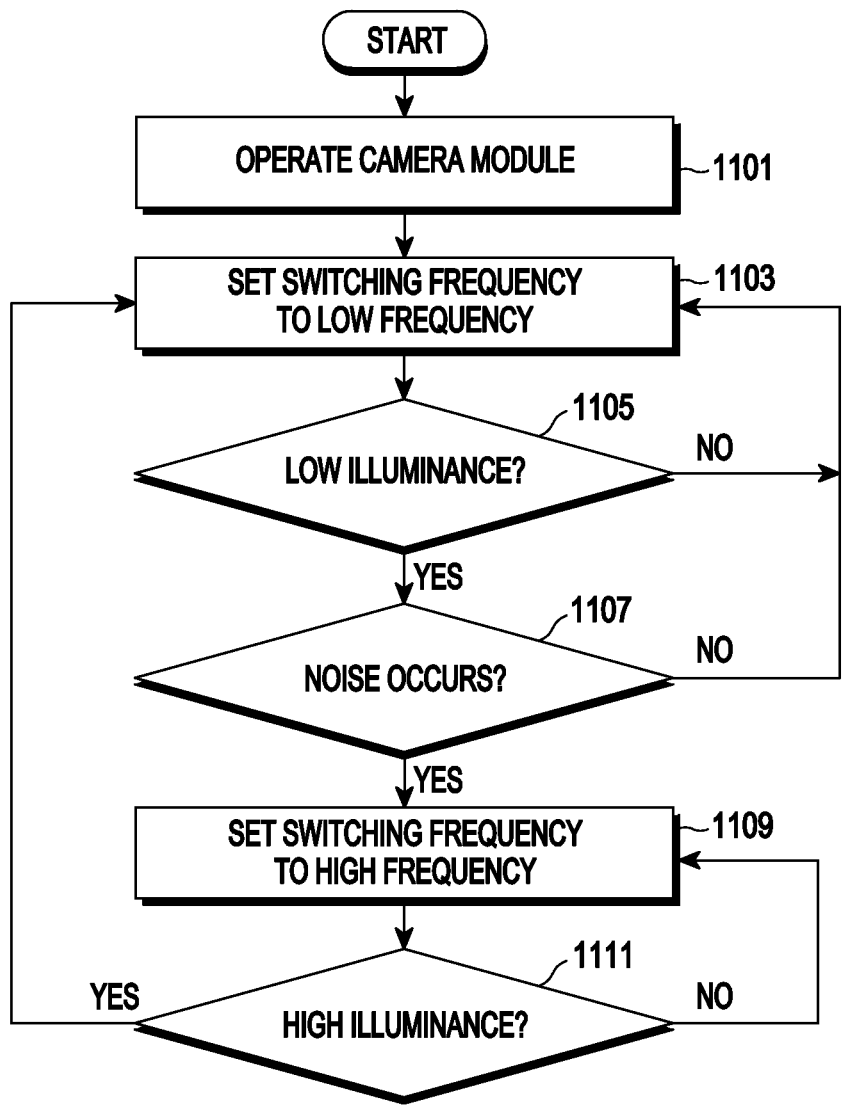
FIG. 11 is a flowchart illustrating an example method of operating an electronic device according to various embodiments.

FIG. 11 is a flowchart illustrating an example method of operating an electronic device according to various embodiments.

Referring to FIG. 11, in operation 1101, according to various embodiments, the electronic device 101 (e.g., the processor 120) may operate the camera module 180.

In operation 1103, according to various embodiments, the electronic device 101 may set the switching frequency of the power converter 210, transferring the converted power to the camera module 180, to a low frequency (e.g., 100 kHz or less).

In operation 1105, according to various embodiments, the electronic device 101 may determine whether the ambient environment of the electronic device 101 is a low-light environment. The electronic device 101 may perform operation 1107 based on the ambient environment being a low-light environment (Yes in operation 1105) and may perform operation 1103 based on the ambient environment not being a low-light environment (No in operation 1105).

In operation 1107, according to various embodiments, the electronic device 101 may determine whether noise occurs in the image obtained through the camera module 180 based on the ambient environment of the electronic device 101 being a low-light environment. The electronic device 101 may perform operation 1109 based on an occurrence of noise (Yes in operation 1107) and perform operation 1103 based on a non-occurrence of noise (No in operation 1107). According to an embodiment, the electronic device 101 may omit operation 1107. When operation 1107 is omitted, the electronic device 101 may perform operation 1109 after operation 1105.

In operation 1109, according to various embodiments, the electronic device 101 may set the switching frequency of the power converter 210 to a high frequency. For example, the electronic device 101 may set the switching frequency of the power converter 210 to a high frequency based on the fact that the ambient environment of the electronic device 101 is a low-light environment and noise occurs in the image obtained through the camera module 180. As another example, the electronic device 101 may set the switching frequency of the power converter 210 to a high frequency based on the fact that the ambient environment of the electronic device 101 is a low-light environment.

In operation 1111, according to various embodiments, the electronic device 101 may determine whether the ambient environment of the electronic device 101 is a high-light environment. The electronic device 101 may perform operation 1103 based on the ambient environment being a high-light environment (Yes in operation 1111) and may perform operation 1109 based on the ambient environment not being a high-light environment (No in operation 1111). In an example, a threshold for the illuminance value set to determine whether it is in low illuminance in operation 1105 and a threshold for the illuminance value set to determine whether it is in high illuminance in operation 1111 may be equal to each other. Alternatively, in another example, the threshold for the illuminance value set to determine whether it is in high illuminance may be set to be larger than the threshold for the illuminance value set to determine whether it is in low illuminance and, in this case, changing of the switching frequency depending on the hysteresis characteristics may be performed.

It may be understood by one of ordinary skill in the art that various example embodiments described herein may be applied mutually organically within the applicable scope.

According to various example embodiments, an electronic device may comprise: a power converter; a camera module comprising a camera; and a processor configured to: identify a first illuminance value of a surrounding of the electronic device in a state in which a switching frequency of the power converter transferring power to the camera module is a first frequency; determine whether the first illuminance value meets a first reference; and set the switching frequency of the power converter to a second frequency different from the first frequency based on the first illuminance value meeting the first reference.

According to various example embodiments, the processor may be configured to determine that the first illuminance value meets the first reference based on the first illuminance value being a first reference value or less.

According to various example embodiments, the processor may be configured to determine that the first illuminance value meets the first reference based on a state in which the first illuminance value is the first reference value or less being maintained for a first time.

According to various example embodiments, the processor may be configured to set the switching frequency of the power converter to the second frequency higher than the first frequency based on the first illuminance value meeting the first reference and an occurrence of noise in an image obtained through the camera module.

According to various example embodiments, the processor may be configured to: identify a first image using the camera module in the state in which the switching frequency of the power converter is the first frequency and identify a second image using the camera module in a state in which the switching frequency of the power converter is the second frequency; and determine whether noise occurs in the image obtained through the camera module while the switching frequency is the first frequency based on a result of a comparison between at least part of the first image and at least part of the second image.

According to various example embodiments, the processor may be configured, as at least part of determining whether the noise occurs based on the result of the comparison, to: identify a first area meeting a second reference among a plurality of areas in the first image; identify a first pixel value of the first area in the first image and a second pixel value of the second area corresponding to the first area in the first image among a plurality of areas in the second image; determine whether a difference between the first pixel value and the second pixel value meets a third reference; and determine whether the noise occurs in the image obtained through the camera module based on the difference meeting the third reference.

According to various example embodiments, the processor may be configured to identify that an area with a lowest average brightness among the plurality of areas in the first image is the first area meeting the second reference.

According to various example embodiments, the plurality of areas in the first image may include a specified number of areas divided according to a specified layout.

According to various example embodiments, the processor may be configured to: identify a plurality of pixel groups including sets of pixels with the difference between the first pixel value and the second pixel value being a second reference value or more; and determine that the difference meets the third reference, based on identifying that intervals between the plurality of pixel groups are substantially the same.

According to various example embodiments, the processor may be configured to: identify a second illuminance value of the surrounding of the electronic device; determine whether the second illuminance value meets a fourth reference; and set the switching frequency of the power converter to the first frequency based on the second illuminance value meeting the fourth reference.

According to various example embodiments, the processor may be configured to determine that the second illuminance value meets the fourth reference based on a state in which the second illuminance value is a third reference value or less being maintained for a second time.

According to various example embodiments, the electronic device may further comprise an illuminance sensor. The processor may be configured to identify the first illuminance value obtained using the illuminance sensor.

According to various example embodiments, the processor may be configured to identify the first illuminance value based on a pixel value of an image obtained through the camera module.

According to various example embodiments, a method for operating an electronic device may comprise: identifying a first illuminance value of a surrounding of the electronic device in a state in which a switching frequency of a power converter of the electronic device transferring power to a camera module of the electronic device is a first frequency; determining whether the first illuminance value meets a first reference; and setting the switching frequency of the power converter to a second frequency different from the first frequency based on the first illuminance value meeting the first reference.

According to various example embodiments, determining whether the first illuminance value meets the first reference may include determining that the first illuminance value meets the first reference based on a state in which the first illuminance value is a first reference value or less being maintained for a first time.

According to various example embodiments, setting the switching frequency of the power converter to the second frequency different from the first frequency may include setting the switching frequency of the power converter to the second frequency higher than the first frequency based on the first illuminance value meeting the first reference and an occurrence of noise in an image obtained through the camera module.

According to various example embodiments, the method may further comprise: identifying a first image using the camera module in the state in which the switching frequency of the power converter is the first frequency; identifying a second image using the camera module in a state in which the switching frequency of the power converter is the second frequency; and determining whether noise occurs in the image obtained through the camera module while the switching frequency is the first frequency based on a result of a comparison between at least part of the first image and at least part of the second image.

According to various example embodiments, determining whether the noise occurs based on the result of the comparison may include: identifying a first area meeting a second reference among a plurality of areas in the first image; identifying a first pixel value of the first area in the first image and a second pixel value of the second area corresponding to the first area in the first image among a plurality of areas in the second image; determining whether a difference between the first pixel value and the second pixel value meets a third reference; and determining whether the noise occurs in the image obtained through the camera module based on the difference meeting the third reference.

According to various example embodiments, identifying the first area meeting the second reference among the plurality of areas in the first image may include identifying that an area with a lowest average brightness among the plurality of areas in the first image is the first area meeting the second reference.

According to various example embodiments, determining whether the difference between the first pixel value and the second pixel value meets the third reference may include: identifying a plurality of pixel groups including sets of pixels with the difference between the first pixel value and the second pixel value being a second reference value or more; and determining that the difference meets the third reference based on identifying that intervals between the plurality of pixel groups are substantially the same.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a power converter;
   a camera module comprising a camera;
   at least one processor; and
   memory storing instructions that, when executed by the at least one processor individually or collectively, cause the electronic device to:
   identify a first illuminance value of a surrounding of the electronic device in a state in which a switching frequency of the power converter transferring power to the camera module is a first frequency;
   determine that the first illuminance value meets a first reference based on a state in which the first illuminance value is a first reference value or less being maintained for a first time; and
   set the switching frequency of the power converter to a second frequency different from the first frequency based on the first illuminance value meeting the first reference.

2. The electronic device of claim 1, wherein the instructions, when executed by the at least one processor individually or collectively, cause the electronic device to set the switching frequency of the power converter to the second frequency higher than the first frequency based on the first illuminance value meeting the first reference and an occurrence of noise in an image obtained through the camera module.

3. The electronic device of claim 2, wherein the instructions, when executed by the at least one processor individually or collectively, cause the electronic device to:
   identify a first image using the camera module in the state in which the switching frequency of the power converter is the first frequency;
   identify a second image using the camera module in a state in which the switching frequency of the power converter is the second frequency; and
   determine whether noise occurs in the image obtained through the camera module while the switching frequency is the first frequency based on a result of a comparison between at least part of the first image and at least part of the second image.

4. The electronic device of claim 3, wherein the instructions, when executed by the at least one processor individually or collectively, cause the electronic device, as at least part of determining whether the noise occurs based on the result of the comparison, to:

identify a first area meeting a second reference among a plurality of areas in the first image;

identify a first pixel value of the first area in the first image and a second pixel value of the second area corresponding to the first area in the first image among a plurality of areas in the second image;

determine whether a difference between the first pixel value and the second pixel value meets a third reference; and determine whether the noise occurs in the image obtained through the camera module based on the difference meeting the third reference.

5. The electronic device of claim 4, wherein the instructions, when executed by the at least one processor individually or collectively, cause the electronic device to identify that an area with a lowest average brightness among the plurality of areas in the first image is the first area meeting the second reference.

6. The electronic device of claim 5, wherein the plurality of areas in the first image include a specified number of areas divided according to a specified layout.

7. The electronic device of claim 4, wherein the instructions, when executed by the at least one processor individually or collectively, cause the electronic device to identify a plurality of pixel groups including sets of pixels with the difference between the first pixel value and the second pixel value being a second reference value or more and determine that the difference meets the third reference based on identifying that intervals between the plurality of pixel groups are substantially the same.

8. The electronic device of claim 1, wherein the instructions, when executed by the at least one processor individually or collectively, cause the electronic device to:

identify a second illuminance value of the surrounding of the electronic device and determine whether the second illuminance value meets a fourth reference; and set the switching frequency of the power converter to the first frequency based on the second illuminance value meeting the fourth reference.

9. The electronic device of claim 8, wherein the instructions, when executed by the at least one processor individually or collectively, cause the electronic device to determine that the second illuminance value meets the fourth reference based on a state in which the second illuminance value is a third reference value or less being maintained for a second time.

10. The electronic device of claim 1, further comprising: an illuminance sensor, wherein the instructions, when executed by the at least one processor individually or collectively, cause the electronic device to identify the first illuminance value obtained using the illuminance sensor.

11. The electronic device of claim 1, wherein the instructions, when executed by the at least one processor individually or collectively, cause the electronic device to identify the first illuminance value based on a pixel value of an image obtained through the camera module.

12. A method for operating an electronic device, the method comprising:

identifying a first illuminance value of a surrounding of the electronic device in a state in which a switching frequency of a power converter of the electronic device transferring power to a camera module of the electronic device is a first frequency;

determining that the first illuminance value meets a first reference based on a state in which the first illuminance value is a first reference value or less being maintained for a first time; and setting the switching frequency of the power converter to a second frequency different from the first frequency based on the first illuminance value meeting the first reference.

13. The method of claim 12, wherein setting the switching frequency of the power converter to the second frequency different from the first frequency includes setting the switching frequency of the power converter to the second frequency higher than the first frequency based on the first illuminance value meeting the first reference and an occurrence of noise in an image obtained through the camera module.

14. The method of claim 13, further comprising:

identifying a first image using the camera module in the state in which the switching frequency of the power converter is the first frequency;

identifying a second image using the camera module in a state in which the switching frequency of the power converter is the second frequency; and determining whether noise occurs in the image obtained through the camera module while the switching frequency is the first frequency based on a result of a comparison between at least part of the first image and at least part of the second image.

15. The method of claim 14, wherein determining whether the noise occurs based on the result of the comparison includes:

identifying a first area meeting a second reference among a plurality of areas in the first image;

identifying a first pixel value of the first area in the first image and a second pixel value of the second area corresponding to the first area in the first image among a plurality of areas in the second image;

determining whether a difference between the first pixel value and the second pixel value meets a third reference; and determining whether the noise occurs in the image obtained through the camera module based on the difference meeting the third reference.

16. The method of claim 15, wherein identifying the first area meeting the second reference among the plurality of areas in the first image includes identifying that an area with a lowest average brightness among the plurality of areas in the first image is the first area meeting the second reference.

17. The method of claim 15, wherein determining whether the difference between the first pixel value and the second pixel value meets the third reference includes:

identifying a plurality of pixel groups including sets of pixels with the difference between the first pixel value and the second pixel value being a second reference value or more; and determining that the difference meets the third reference based on identifying that intervals between the plurality of pixel groups are substantially the same.

* * * * *